May 19, 1936. I. COWLES 2,040,834
FLEXIBLE CONDUIT
Filed Oct. 27, 1934
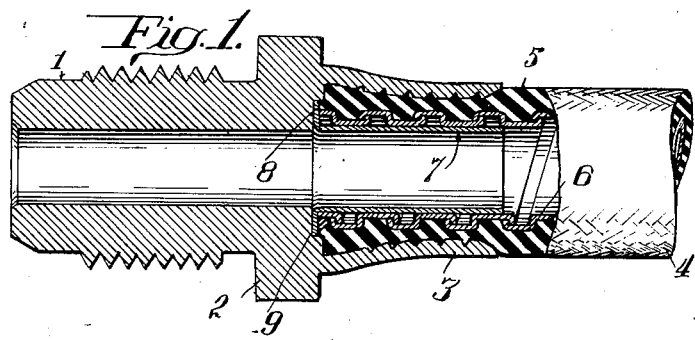
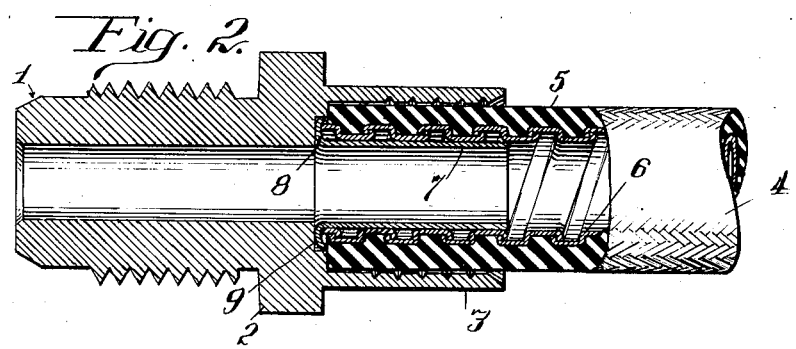
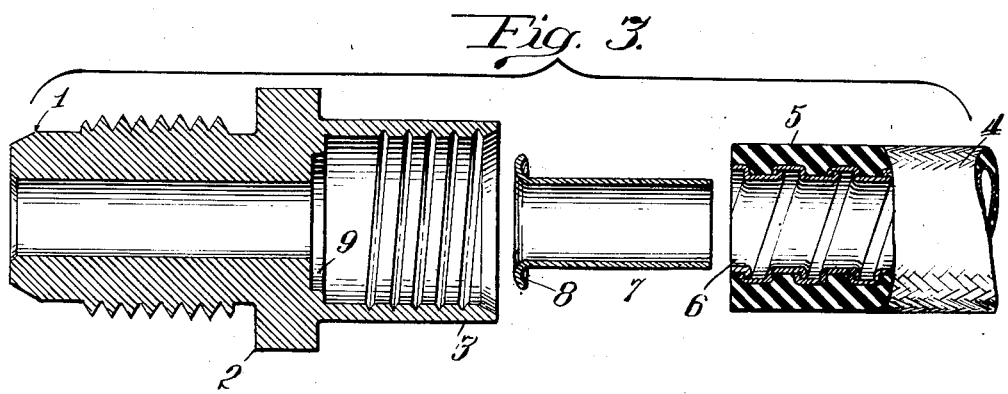
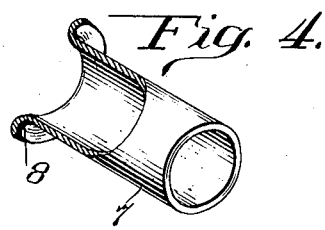
Inventor
Irving Cowles Patented May 19, 1936

2,040,834

UNITED STATES PATENT OFFICE 2,040,834

FLEXIBLE CONDUIT

Irving Cowles, Detroit, Mich.

Application October 27, 1934, Serial No. 750,302

4 Claims. (Cl. 285—84)

The present invention relates to a flexible conduit which includes a type of hose known as internally armored or metal lined. This type of hose is used extensively for conveying naphtha and similar fluids which have a decomposing effect on rubber or other compositions constituting the main wall of the hose structure.

The main object of the present invention is to provide a flexible conduit which is simple, cheap and efficient and so constructed as to prevent particles of decomposed or otherwise deteriorated hose wall material from entering the channel through the hose and thus reaching carburetors, or the like, and clogging the same.

A suitable embodiment of the invention is illustrated in the accompanying drawing, wherein:

Fig. 1 is a central, longitudinal section of an end portion of a flexible conduit constructed in accordance with the invention.

Fig. 2 is a sectional view similar to Fig. 1 showing a coupling, the hose end and a ferrule or sleeve for the latter in relative position preparatory to contracting the shell of the hose coupling of the structure as shown in Fig. 1.

Fig. 3 is a view similar to Figs. 1 and 2, showing the several component elements of a flexible conduit in disassembled relation.

Fig. 4 is a perspective view, partly in section, of the ferrule or sleeve of the structure.

The coupling constituting an element of the present invention, comprises a body portion (1) which, in the instance illustrated, is externally threaded. The said coupling includes a middle portion (2) which, preferably, is externally hexagonal. The other end portion of the coupling constitutes a contractible coupling shell (3) which is initially cylindrical as shown in Fig. 2 and is contracted substantially to the form shown in Fig. 1, by progressively contracting said shell from its mouth toward its inner end portion as fully disclosed in Letters Patent No. 1,752,976 heretofore granted to me.

The hose (4) which is intended to be engaged in the coupling, comprises generally an outer jacket of fabric of suitable material, a wall (5) composed of rubber or similar flexible material, and an inner jacket of opposed interengaging helical metal strips (6) which provide a flexible metal lining sufficiently tight under all circumstances to prevent loose particles of wall material from entering the channel of the hose.

In practice, the hose (4) is cut into suitable lengths for gasoline and other flow lines by means of a suitable saw which cuts the hose perpendicularly to its longitudinal axis as shown at the right hand side of Fig. 3. This, obviously, leaves weakened portions of the lining metal (6) at the extremity of the hose which are very easily distorted under the influence of pressure on the exterior of the hose and furthermore, permits loose particles of material of the wall (5) of the hose to find their way into the channel or passage of the hose as said hose wall deteriorates under the influence of fluids, which, under the influence of pressure, seep through the armor or metal lining (6).

To prevent distortion of the metal lining (6) at the extremity of the hose under the influence of pressure exerted thereon by contraction of the shell (3) of the coupling, as indicated in Fig. 1 and to prevent any possibility of penetration of hose wall material into the passage through the hose, a sleeve or ferrule (7), having an annular flange (8) at one end, is inserted into the end of the hose before the latter is inserted into the shell of the coupling, as shown in Fig. 3. The said flange (8) is received in an annular recess (9) in the interior of the body of the coupling opposed to the mouth of the shell (3), said recess being of a diameter equal or substantially equal to that of said flange (8) and of smaller diameter than the coupling shell (3). The said flange (8) of the sleeve (7) is initially convex on the face opposed to the recess (9) and concave on the face opposed to the hose end. Said recess is substantially filled by the flange (8) and under the influence of the pressure exerted on the hose wall by contraction of the coupling shell (3), as shown in Fig. 1, the said flange (8) is so firmly compressed against the end wall of the recess (9) as to be flattened out and, at the same time, the hose wall material displaced by contraction of the coupling shell (3) is crowded against the end wall of the shell portion of the coupling so as to form fluid-tight joints. This pressure naturally also compresses the interengaging metal lining strips (6) into close engagement with each other and into close contact with the sleeve or ferrule (7) so that little or no leakage can occur at this point and the resulting structure, therefore, is very cheap and efficient and performs the intended function of preventing loose particles of hose wall material from finding their way into the channel or passage of the hose (5).

The employment of the sleeve (7) in place of an inner stem integral with or secured to the body of the coupling is extremely advantageous from the standpoint of lower cost and greater ease of assembly in that the hose end is inserted more easily into the coupling shell (3) and particularly so in instances, which are quite common, wherein the hose wall (5) is somewhat eccentric to the cylindrical plane of the metal lining (6) so that there is a greater thickness of wall at one side than the other of said hose. In such instances the flange (8) of the sleeve (7) cooperates with the recess (9) of the coupling to effect a centering of the hose end portion within the shell (3). After such insertion into the coupling shell, the convex face of the flange (8) of the sleeve (7) cooperating with the outer peripheral wall of the recess (9) to effect centering in an obvious manner.

A further and very important advantage of the invention lies in the fact that in many instances wherein the flexible hose wall of rubber or similar material is more or less eccentric to the metal inner lining of the hose, the loose sleeve as distinguished from a sleeve which is rigid with the coupling body, cooperates with the outer shell of the hose when the latter is contracted to cause a far more uniform compression of the outer wall than would occur in instances where the said sleeve is rigid with the coupling body.

The eccentricity referred to in the preceding paragraph is so common that it is preferable to make the annular recess (9) of slightly larger diameter than the outer diameter of the flange (8) of the sleeve, as for exampe, in a one-inch coupling, said diameter of the recess (9) would be approximately one-thirtysecond ($\frac{1}{32}$), more or less, greater than that of the said flange (8) and this proportionate degree of difference in diameter would be maintained in couplings of other sizes.

I claim as my invention:

1. A flexible conduit assembly comprising a coupling consisting of a body member and a hose receeiving shell concentric with the bore of said body portion, a hose length comprising in part a rubber wall and a flexible metal lining embraced thereby, a sleeve equipped at one end with an annular outwardly projecting flange, said sleeve being mounted in one end portion of the hose length and the flange thereof being disposed in overlapping relation to an extremity of said metal lining and to a part of said rubber wall, the end portion of said hose containing said sleeve being permanently engaged by said shell, the body of said coupling presenting an annular shoulder at the inner end of the shell against which the portion of the extremity of the rubber wall of the hose bordering the flange of said sleeve is compressed permanently to provide a fluid tight joint, said flange of said sleeve being maintained permanently compressed against the extremity of the hose to provide a fluid tight joint between the latter and said flange, said hose and sleeve being held by said shell against movement relatively to all parts of the coupling.

2. A flexible conduit comprising a length of hose consisting in part of a rubber wall and a flexible metallic lining, a coupling for an end portion of said hose consisting of a body portion presenting an annular wall opposed to an extremity of the rubber wall of the hose and compressed against the same to provide a fluid tight joint, a shell compressed upon said end portion of said hose length and engaging the same against rotation relatively to all parts of said coupling, there being a central recess in said annular wall of said coupling, and a sleeve projecting into said metal lining of said hose in the end portion of the latter disposed within the coupling shell, said sleeve being equipped with an annular outwardly extending flange opposed to the end of the metal lining of the hose length and within said recess and partly overlapping and compressed against the extremity of the rubber wall of the hose, said recess being of greater diameter than said flange of said sleeve whereby the latter may become disposed eccentric to the axis of the coupling.

3. A flexible conduit comprising a coupling including a body portion and a shell concentric with a central bore through the body of the coupling, a hose length consisting in part of a rubber wall and a flexible metal lining and having an end portion disposed within and firmly engaged with said shell against all movement relatively to all parts of said coupling, the body portion of the latter presenting an annular shoulder opposed to and against which a portion of the rubber wall of the hose is permanently compressed, there being a central recess between said shoulder and the said bore of said coupling, and a sleeve engaged in the end portion of said metal lining adjacent said shoulder, said sleeve being equipped with an annular flange overlapping the extremity of said metal lining and partly overlapping the rubber wall of the hose and substantially filling said recess.

4. A flexible conduit comprising a coupling including a body portion and a shell concentric with a central bore through the body of the coupling, a hose length consisting in part of a rubber wall and a flexible metal lining and having an end portion disposed within and firmly engaged with said shell against all movement relatively to all parts of said coupling, the body portion of the latter presenting an annular shoulder opposed to and against which a portion of the rubber wall of the hose is permanently compressed, there being a central recess between said shoulder and the said bore of said coupling, and a sleeve engaged in the end portion of said metal lining adjacent said shoulder, said sleeve being equipped with an annular flange overlapping the extremity of said metal lining and partly overlapping the rubber wall of the hose and lying within said recess, the latter being of larger diameter than said flange whereby to permit the latter to become disposed eccentric to the axis of the coupling, said flange being permanently compressed against the portion of the rubber wall opposed to the same.

IRVING COWLES.